United States Patent
Pieraccini

(10) Patent No.: US 10,690,768 B2
(45) Date of Patent: Jun. 23, 2020

(54) SYNTHETIC-APERTURE INTERFEROMETRIC RADAR WITH AN ANTENNA SLIDING ALONG A ROTATING ARM

(71) Applicant: UNIVERSITA' DEGLI STUDI DI FIRENZE, Florence (IT)

(72) Inventor: Massimiliano Pieraccini, Florence (IT)

(73) Assignee: UNIVERSITA' DEGLI STUDI DI FIRENZE, Florence (IT)

( * ) Notice: Subject to any disclaimer, the term of this patent is extended or adjusted under 35 U.S.C. 154(b) by 218 days.

(21) Appl. No.: 15/747,974

(22) PCT Filed: Jul. 22, 2016

(86) PCT No.: PCT/IB2016/001039
§ 371 (c)(1),
(2) Date: Jan. 26, 2018

(87) PCT Pub. No.: WO2017/055901
PCT Pub. Date: Apr. 6, 2017

(65) Prior Publication Data
US 2018/0224541 A1    Aug. 9, 2018

(30) Foreign Application Priority Data

Jul. 27, 2015  (IT) .................. 102015000038489

(51) Int. Cl.
*G01S 13/90*   (2006.01)
(52) U.S. Cl.
CPC ........ *G01S 13/9023* (2013.01); *G01S 13/904* (2019.05); *G01S 13/9047* (2019.05); *G01S 13/9082* (2019.05); *G01S 13/9088* (2019.05)
(58) Field of Classification Search
CPC .. F23D 11/44; F23D 2900/21002; F23D 5/04; F23D 5/045; F23D 5/06; F24C 5/02;
(Continued)

(56) References Cited

U.S. PATENT DOCUMENTS

| 5,379,041 A | 1/1995 | Klausing |
| 2006/0139224 A1* | 6/2006 | Tietjen ............... G01S 7/03 343/757 |

(Continued)

FOREIGN PATENT DOCUMENTS

| EP | 1145038 B1 | 5/2003 |
| EP | 2194400 A1 | 6/2010 |

OTHER PUBLICATIONS

M. Pieraccini, D. Tarchi, H. Rudolf, D. Leva, G. Luzi, C. Atzeni, Interferometric radar for remote monitoring of building deformations, Electronics Letters, vol. 36, No. 6, pp. 569-570 (2000).
(Continued)

*Primary Examiner* — Timothy X Pham
(74) *Attorney, Agent, or Firm* — McGlew and Tuttle, P.C.

(57) ABSTRACT

An interferometric radar comprising an arm (2), which rotates with respect to an axis (z) of a plane (zx) orthogonal to an axis of rotation (y), a system of antennas (1), which are fixed to said arm (2), are able both to move along the arm and to describe complete revolutions along a circular path about said axis (y), and are oriented in a direction of sight (a) parallel to the axis (y), motor-drive means (3) for driving the arm (2) and the system of antennas along the arm, a data-acquisition and processing unit (10) operatively connected to said antenna (1) for acquiring a succession of images detected by the antenna during its revolution about the axis (y) and making differential interferometric calculations for measuring at least one component of the displacement of one or more targets in the field of view.

13 Claims, 2 Drawing Sheets

(58) Field of Classification Search
CPC .............. G01S 13/904; G01S 13/9047; G01S 13/9082; G01S 13/9088
USPC .......................................................... 342/25
See application file for complete search history.

(56) References Cited

U.S. PATENT DOCUMENTS

2010/0265117 A1* 10/2010 Weiss ................... G01S 13/003
                                                        342/22
2014/0285375 A1*  9/2014 Crain ................... G01S 13/885
                                                        342/25 A
2018/0217253 A1*  8/2018 Pieraccini ............... G01S 7/025

OTHER PUBLICATIONS

Tricoles et al., Microwave Holography: Application and Techniques, Proceedings of the IEEE, IEEE, New York, US, vol. 65, No. 1, Jan. 1, 1997, pp. 108-121.
Axelsson S R J, Beam Characteristics of Three-Dimensional SAR in Curved or Random Paths, IEEE Transactions on Geoscience and Remote Sensing, IEEE Service Center, Piscataway, NJ, US, vol. 42, No. 10, Oct. 1, 2004, pp. 2324-2334.
N. H. Farhat et al., Double circular scanning in microwave holography, Proceedings of the IEEE, vol. 61, No. 4, Apr. 1, 1973, pp. 509-510.
Lee Hoonyol et al., Development of a Truck-mounted Arc-Scanning Synthetic Aperture Radar, IEEE Transactions on Geoscience and Remote Sensing, IEEE Service Center, Piscataway, NJ, US, vol. 52, No. 5, May 1, 2014, pp. 2773-2779.

* cited by examiner

SYNTHETIC-APERTURE INTERFEROMETRIC RADAR WITH AN ANTENNA SLIDING ALONG A ROTATING ARM

FIELD OF THE INVENTION

The invention relates to a synthetic-aperture interferometric radar with an antenna that is able to slide along a rotating arm, oriented with the direction of sight orthogonal to the plane of rotation.

PRIOR ART

Interferometric radars referred to as GB-SARs (Ground-Based Synthetic-Aperture Radars) devised in particular for monitoring structures of large dimensions such as hillsides, open-cast mines, large architectural structures, such as towers and bridges have been known for some time. GB-SAR technology is of particular interest because it constitutes a radar technique capable of providing high-precision displacement maps over an entire range of observation. In their basic conformation, conventional GB-SARs are obtained by moving an antenna along an axis, as described in the paper by M. Pieraccini, D. Tarchi, H. Rudolf, D. Leva, G. Luzi, C. Atzeni, *Interferometric radar for remote monitoring of building deformations, Electronics Letters*, Vol. 36, No. 6, pp. 569-570 (2000).

The U.S. Pat. No. 5,379,041 describes a SAR that makes use of an antenna fixed on a rotating arm and oriented in a radial direction, which enables creation of 360-degree images. The system described is, however, of a non-interferometric type, and the image forms in a plane parallel to the plane of rotation instead of in a plane orthogonal thereto.

The patent No. EP1145038 describes a rotating-antenna interferometric synthetic-aperture radar, designed for measuring angles, which requires at least two coherent receiving antennas and in which the image forms in a plane parallel to the plane of rotation.

The patent No. EP2194400 describes a non-interferometric radar constituted by an antenna mounted on the sail of a windmill, which hence turns in the vertical plane and supplies an image in the space in front of the plane of rotation.

In this system, SAR synthesis occurs using the entire circumference, providing azimuth and elevation information, but with marked secondary lobes due to sampling on a closed line, and can hence be used for surveillance purposes, i.e., for detection of pointlike objects (aeroplanes or ships), but is not suitable for measuring small displacements for monitoring hillsides or buildings.

From Tricoles et al. "Microwave Holography: Application and Techniques"—Proceedings of the IEEE, it is known an application technique of microwave holography in which a receiving antenna is moving along a spiral path defining a scanning plane which forms the hologram plane.

From Sune R. J Axelsson: "Beam characteristics of three dimensional SAR in curved or random Paths"—IEEE Transactions on Geoscience and remote sensing", it is known to investigate the beam characteristics of 3D SAR for different kinds of SAR paths among which a spiral path.

The known solutions present some significant drawbacks in the context of the systems for measuring displacements, in particular because they are able to provide only a two-dimensional image of the field of view and only one radial component.

PURPOSE OF THE INVENTION

The purpose of the present invention is then to propose an interferometric radar equipped with an antenna that rotates with the direction of sight orthogonal to the plane of rotation that will be free from the aforementioned drawbacks of the systems of a known type.

SUMMARY OF THE INVENTION

The above and further purposes are achieved with an interferometric radar according to one or more of the annexed claims.

A first advantage of the invention lies in the fact that the interferometric radar proposed is able to obtain a three-dimensional image of the field of view.

A second advantage of the invention lies in the fact that the interferometric radar proposed is able to measure the displacement vector and not only one component.

LIST OF THE DRAWINGS

The above and further advantages will be better understood by any person skilled in the branch from the ensuing description and from the annexed drawings, which are provided by way of non-limiting example and in which.

DETAILED DESCRIPTION

Figure 1:
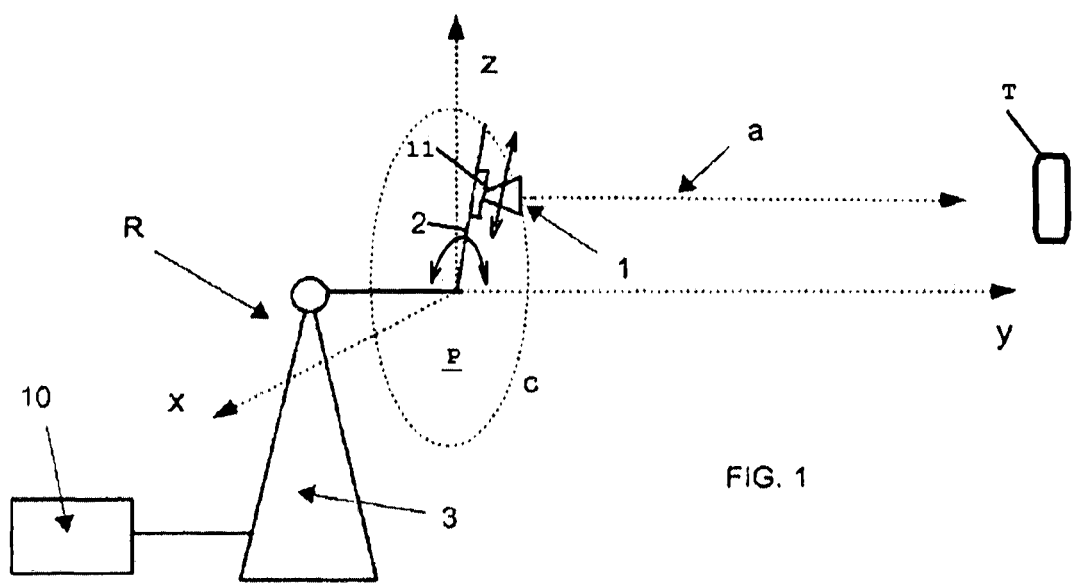
FIG. 1 is a schematic view of a rotating radar antenna according to the invention.

With reference to the attached drawings, a radar R according to the invention is described, which comprises an acquisition and processing unit 10, which receives the data detected by at least one antenna 1, which rotates in the plane zx orthogonal to the direction of sight y of the antenna and is fixed to an arm 2 that can be set in rotation by a motor-drive support 3.

The antenna 1 can slide along the arm 2 by means of a motor-drive system (not shown), which enables the two-dimensional movement of the antenna along the arm.

In various embodiments, the motor drive 11 of the antennas along the arm 2 may be independent or not of the motor drive that enables rotary motion of the arm 2, and there may moreover be provided means for synchronisation of the rotary movement and of the linear movement of the antennas. The radar R moreover comprises a data-acquisition and processing unit 10, which is operatively connected to said system of antennas 1 and is configured for acquiring a succession of images detected by the antenna during its revolution about the axis y and making differential interferometric calculations on at least two successive images of possible targets T located in the field of view of the system of antennas 1 in order to measure at least one component of the displacement thereof.

FIG. 1 is a schematically representation of the case of a single antenna 1, but the antenna 1 may be equivalently constituted by two or more antennas (one for transmitting and one for receiving).

Figure 2:
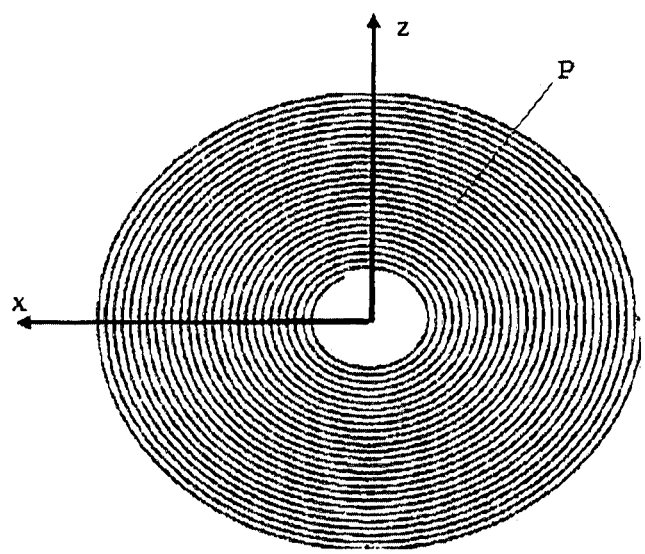
FIG. 2 shows a possible path of the antenna system in the plane xz.
Figure 3:
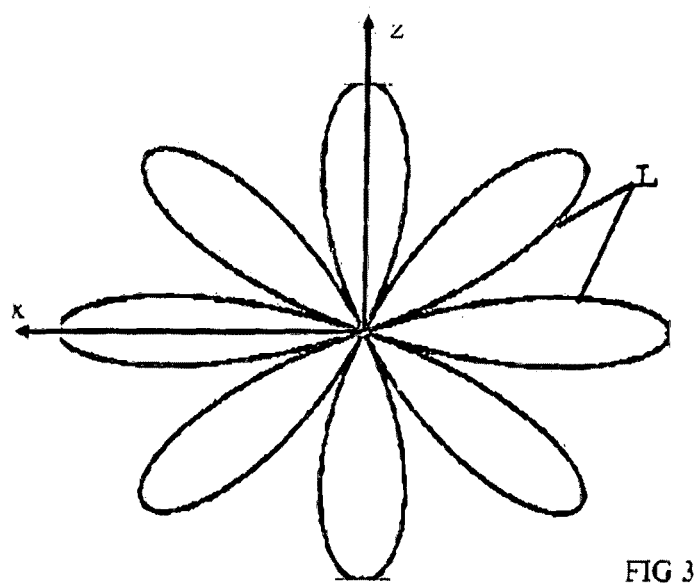
FIG. 3 shows another possible path of the antenna system in the plane xz.

In preferred examples of operation, the movement of the antenna may be obtained in different ways, amongst which:

1) "stepper mode": the arm turns in steps (which are sufficiently short to prevent any angular ambiguity in reconstruction of the image); when the arm has described a complete revolution or circular path C, the antenna shifts along the arm (by a step that is sufficiently short to prevent any angular ambiguity in reconstruction of the image) and then performs another revolution; in this way, in discrete steps the entire surface P swept by the arm, or scanning plane, is covered; the circular steps may be of a constant angle or else, in order to reduce the acquisition time, of a constant arc;

2) "spiral mode" (FIG. 2): the arm turns at a constant rate, and the antenna moves radially at a constant rate; for each revolution, the radial movement must be sufficiently small as not to produce any angular ambiguity in the image (the pitch depends upon the lobe of the antenna; in the worst case that corresponds to the omnidirectional antenna, it must be less than a quarter of the wavelength); the movement as a whole appears as a spiral from the periphery to the centre, or vice versa;

3) "complex-spiral mode" (FIG. 3): the arm turns at a constant rate and the antenna moves radially at a non-constant rate; in this case, the antenna describes a shape L in the plane that may resemble a flower with a number of petals or other shapes depending upon how the radial velocity of the antenna varies in time.

The data of an entire acquisition may be appropriately windowed, with a radial window, in order to reduce the side lobes. In the case where sampling is obtained with the stepper mode with constant spatial spacing, the window may be for example a classic window that weights the centre more than the periphery. In the case of stepper acquisition at constant angle (or equivalently at constant time of sampling of the spiral movement) the window will have to be of an inverse type, i.e., one that weights the periphery more than the centre.

The data of an entire acquisition, processed by means of synthetic-aperture techniques, supply a three-dimensional image of the field of view that contains also the phase information. By exploiting two images taken at different time intervals (for example, in succession) it is possible to measure the possible radial displacements of the targets in the field of view by calculating the phase difference in the corresponding image point, applying the known interferometric techniques.

Figure 4:
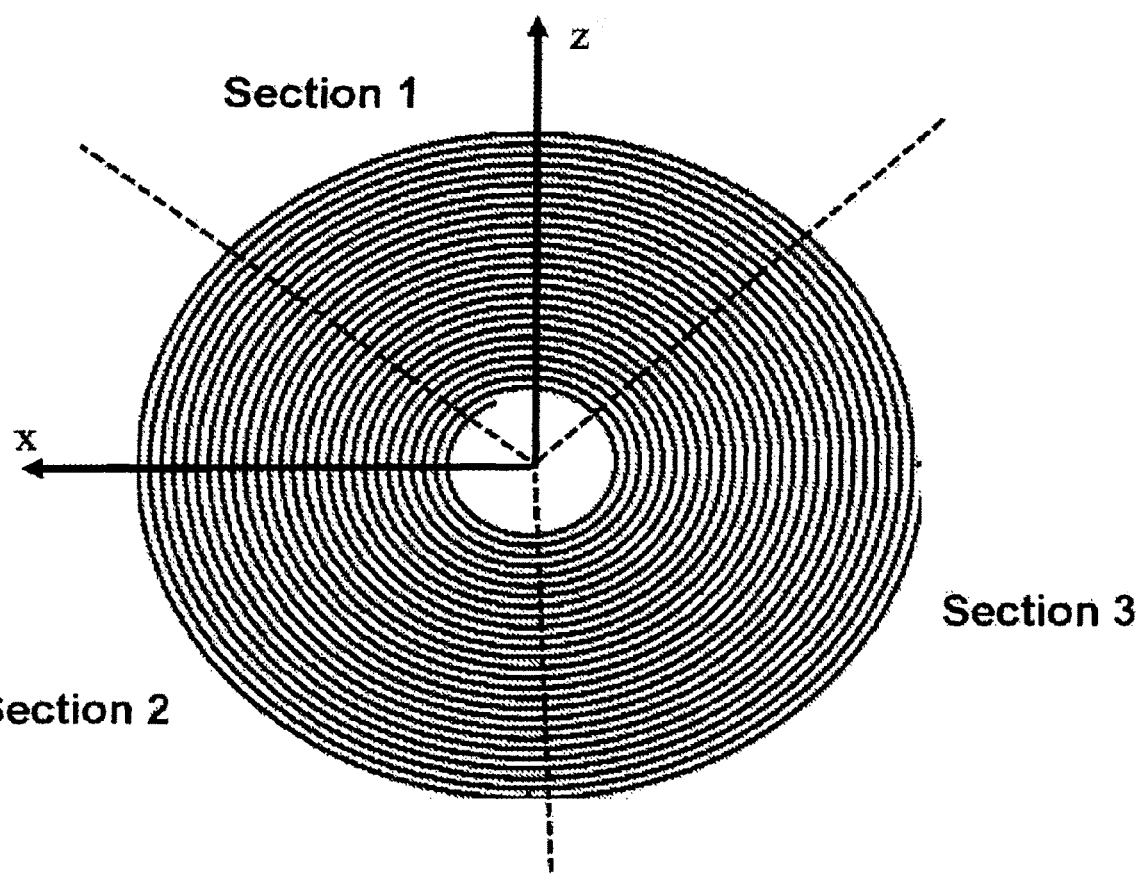
FIG. 4 shows a possible division into sections of the plane scanned by the antennas so as to obtain three components of the displacement of the targets in the field of view.

A possible variant of the technique makes use only of one part of the acquired data. For example, it is possible to process separately the samples of the top semicircle and the samples of the bottom semicircle. In this way, two images are obtained with an angular resolution that is lower than that of the image obtained with the entire circle, but with the advantage that two components of the possible displacement of a target in the field of view are obtained: the component from the image point of the target to the phase centre of the top semicircle, and the component from the image point of the target to the phase centre of the bottom semicircle. The entire circle may also be processed in three sections (FIG. 4), which may also partially overlap, so as to obtain the three components of the displacement vector.

The present invention has been described according to preferred embodiments, but equivalent variants may be conceived without thereby departing from the sphere of protection of the invention.

The invention claimed is:

1. A synthetic-aperture interferometric radar comprising:
an arm, which rotates with respect to an axis of a plane orthogonal to an axis of rotation;
a system of one or more transmitting and receiving antennas, which are slidably mounted along said arm so as to be able to describe complete revolutions of variable radius along a circular path about said axis of rotation and said one or more transmitting and receiving antennas are oriented in a direction of sight parallel to said axis of rotation;
motor for driving rotation of said arm;
motor for driving bi-directional sliding of said one or more transmitting and receiving antennas along said arm; and
a data acquiring processor, operatively connected to said system of said one or more transmitting and receiving antennas and said data acquiring processor configured for acquiring a succession of images detected by said one or more transmitting and receiving antennas during rotation of said one or more transmitting antennas about said axis of rotation and said data acquiring processor making differential interferometric calculations on at least two successive images of possible targets located in a field of view of said system of one or more transmitting antennas in order to measure at least one component of displacement thereof.

2. The radar according to claim 1, wherein said data acquiring processor unit processes data detected on sections of an area scanned by said one or more transmitting and receiving antennas and calculates interferograms between images acquired from one of said section in order to obtain two components of displacements of one or more targets.

3. The radar according to claim 2, wherein said data acquiring processor processes said data detected along three distinct sections of said area scanned by said one or more transmitting and receiving antennas and said data acquiring processor calculates said interferograms between successive images acquired from one arc in order to obtain three components of said displacement in three directions of at least one of said targets.

4. The radar according to claim 1, wherein said data acquiring processor processes data detected along three distinct sections of an area scanned by said one or more transmitting and receiving antennas and said data acquiring processor calculates interferograms between successive images acquired from one arc in order to obtain three components of said displacement in three directions of at least one of said targets.

5. The radar according to claim 1, wherein said data acquiring processor applies a direct or inverse radial windowing on acquired data.

6. A method for monitoring displacements of one or more targets, the method being run by means of an interferometric radar, the method comprising:
providing an arm;
rotating said arm with respect to an axis of a plane orthogonal to an axis of rotation;
providing a system of one or more transmitting and receiving antennas, which are slidably mounted along said arm so as to be able to describe complete revolutions of variable radius along a circular path about said axis of rotation and said one or more transmitting and receiving antennas are oriented in a direction of sight parallel to said axis of rotation;
moving said one or more transmitting and receiving antennas bi-directionally along said arm; and operating said one or more transmitting and receiving antennas to detect images by radar;

providing a data acquiring processor operatively connected to said system;

acquiring a succession of the images detected by said one or more transmitting and receiving antennas during rotation of said one or more transmitting and receiving antennas about said axis of rotation; and using said data acquiring processor for calculating differential interferometric on at least two successive images of possible targets located in a field of view of said system in order to measure at least one component of displacement thereof.

7. The method according to claim 6, wherein said data acquiring processor processes data detected on sections of an area scanned by said one or more transmitting and receiving antennas and said data acquiring processor calculates interferograms between said images acquired from one of said section in order to obtain two components of displacements of one or more of said targets.

8. The method according to claim 7, wherein said data acquiring processor applies a direct or inverse radial windowing on acquired data.

9. The method according to claim 7, wherein said data acquiring processor processes said data detected along three distinct sections of a semipath and said data acquiring processor calculates said interferograms between successive images acquired from one section of arc in order to obtain three components of said displacement in three directions of one of said targets.

10. The method according to claim 6, wherein said data acquiring processor processes data detected along three distinct sections of a semipath and said data acquiring processor calculates interferograms between successive images acquired from one section of acr in order to obtain three components of said displacement in three directions of one of said targets.

11. The method according to claim 10, wherein said data acquiring processor applies a direct or inverse radial windowing on acquired data.

12. The method according to claim 6, wherein said data acquiring processor applies a direct or inverse radial windowing on acquired data.

13. A synthetic-aperture interferometric radar comprising:
an arm rotatable about an axis of rotation;
a system of a transmitting antenna and a receiving antenna, said transmitting antenna and said receiving antenna being slidably mounted along said arm, said transmitting antenna and said receiving antenna being configured to transmit and receive in a direction parallel to said axis of rotation while said transmitting antenna and said receiving antenna slide along said arm, and said arm rotates about said axis of rotation;
a rotating motor configured to rotate said arm about said axis of rotation;
a sliding motor configured to bi-directional slide said transmitting and receiving antenna along said arm; and
a processor configured to acquire a succession of images detected by said transmitting and receiving antennas during rotation of said arm about said axis of rotation, said processor being configured to make differential interferometric calculations on two successive images of a possible target located in a field of view of said system transmitting and receiving antennas in order to measure a component of displacement of the target.

* * * * *